(12) United States Patent
Morijiri et al.

(10) Patent No.: US 7,605,006 B2
(45) Date of Patent: Oct. 20, 2009

(54) METHOD OF MANUFACTURING A MAGNETIC HEAD

(75) Inventors: Makoto Morijiri, Kanagawa (JP); Haruko Tanaka, Kanagawa (JP); Junichi Tanabe, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 340 days.

(21) Appl. No.: 11/331,426

(22) Filed: Jan. 11, 2006

(65) Prior Publication Data

US 2006/0172532 A1    Aug. 3, 2006

(30) Foreign Application Priority Data

Jan. 11, 2005    (JP)    ............................. 2005-003614

(51) Int. Cl.
*G11B 5/39* (2006.01)
*H01L 21/312* (2006.01)
*H01L 21/00* (2006.01)
*G11B 5/33* (2006.01)

(52) U.S. Cl. ................... 438/3; 438/751; 257/E21.039; 360/324

(58) Field of Classification Search .................. 438/670, 438/3, 694, 703–704, 725, 745, 749, 750, 438/751, 763, 780, 942; 257/E21.023, E21.024, 257/E21.025, 21.035, E21.036, E21.038, 257/E21.039; 360/313–328, 114.01–130.34; 29/603.07
See application file for complete search history.

(56) References Cited

U.S. PATENT DOCUMENTS 5,701,221 A * 12/1997 Taniyama et al. ......... 360/327.3
5,843,521 A * 12/1998 Ju et al. ...................... 428/336
5,892,641 A *  4/1999 Ishiwata ................... 360/327.1
5,897,969 A *  4/1999 Taniyama et al. ........... 428/833
6,067,703 A *  5/2000 Takahashi et al. ......... 29/603.13

(Continued)

FOREIGN PATENT DOCUMENTS

JP    06-267843    9/1994

(Continued)

*Primary Examiner*—Matthew C Landau
*Assistant Examiner*—Maliheh Malek
(74) *Attorney, Agent, or Firm*—Townsend and Townsend and Crew LLP; Rambod Nader (57) ABSTRACT

In forming a narrow pattern, it is difficult to form a lift-off resist pattern with an overhang shape. Accordingly, it results in a phenomenon in which the angle at the end of the GMR layer is reduced to 45° or less. It is necessary to provide a lift-off resist pattern that forms the end of the GMR film to be at an angle of as abrupt as 45° or more and ensures lift-off. According to one embodiment of the invention, a method of manufacturing a thin film magnetic head of using a resist pattern comprises three-layered organic films of a PMGI layer, an organic film layer and an image layer from the lower layer as a lift-off resist pattern, etching the organic film layer and the PMGI layer by using the imaging layer as a mask, then etching a GMR layer by using, as a mask, a lift-off resist pattern in which the organic film layer and the imaging layer are formed into the overhang shape prepared by etching the PMGI layer in a developer solution, and then forming a magnetic domain control film and an electrode film on both ends of the GMR layer by using a lift-off method.

16 Claims, 11 Drawing Sheets

U.S. PATENT DOCUMENTS

| | | | | |
|---|---|---|---|---|
| 6,271,115 | B1 * | 8/2001 | Liu et al. | 438/618 |
| 6,345,435 | B1 * | 2/2002 | Han et al. | 29/603.14 |
| 6,393,692 | B1 * | 5/2002 | Ju et al. | 29/603.14 |
| 6,434,814 | B1 * | 8/2002 | Chang et al. | 29/603.14 |
| 6,444,406 | B1 * | 9/2002 | Ito et al. | 430/320 |
| 6,445,550 | B1 * | 9/2002 | Ishi | 360/317 |
| 6,526,649 | B2 * | 3/2003 | Ohkawara | 29/603.07 |
| 6,605,412 | B2 | 8/2003 | Iwata et al. | |
| 6,718,623 | B2 * | 4/2004 | Sasaki et al. | 29/603.14 |
| 7,186,348 | B2 * | 3/2007 | Chen et al. | 216/22 |
| 7,203,032 | B2 * | 4/2007 | Kimura et al. | 360/125.38 |
| 7,244,368 | B2 * | 7/2007 | Suda et al. | 216/22 |
| 7,395,595 | B2 * | 7/2008 | Lee et al. | 29/603.16 |
| 7,506,428 | B2 * | 3/2009 | Bedell et al. | 29/603.12 |
| 7,515,380 | B2 * | 4/2009 | Kubo et al. | 360/125.01 |
| 7,517,463 | B1 * | 4/2009 | Bonhote et al. | 216/22 |
| 2001/0053043 | A1 * | 12/2001 | Kanazawa et al. | 360/110 |
| 2002/0135947 | A1 * | 9/2002 | Aoki et al. | 360/322 |
| 2003/0060055 | A1 * | 3/2003 | Kamijima | 438/725 |
| 2003/0098464 | A1 * | 5/2003 | Kon et al. | 257/194 |
| 2003/0223158 | A1 * | 12/2003 | Sasaki et al. | 360/322 |
| 2004/0127041 | A1 * | 7/2004 | Kamijima | 438/689 |
| 2004/0158973 | A1 * | 8/2004 | Arasawa et al. | 29/603.15 |
| 2004/0212932 | A1 * | 10/2004 | Shimazawa et al. | 360/320 |
| 2004/0214353 | A1 * | 10/2004 | Nishiyama et al. | 438/3 |
| 2005/0147924 | A1 * | 7/2005 | Cornwell et al. | 430/320 |
| 2005/0185332 | A1 * | 8/2005 | Hsiao et al. | 360/122 |
| 2005/0264931 | A1 * | 12/2005 | McFadyen | 360/126 |
| 2005/0277299 | A1 * | 12/2005 | Le et al. | 438/694 |
| 2006/0234483 | A1 * | 10/2006 | Araki et al. | 438/551 |
| 2006/0278604 | A1 * | 12/2006 | Yoshida et al. | 216/22 |
| 2007/0019326 | A1 * | 1/2007 | Ohtomo et al. | 360/126 |
| 2007/0137028 | A1 * | 6/2007 | Carey et al. | 29/603.14 |

FOREIGN PATENT DOCUMENTS

JP      2003-131386      9/2003

* cited by examiner

METHOD OF MANUFACTURING A MAGNETIC HEAD

CROSS-REFERENCES TO RELATED APPLICATIONS

This application claims priority from Japanese Patent Application No. JP2005-003614, filed Jan. 11, 2005, the entire disclosure of which is incorporated herein by reference.

BACKGROUND OF THE INVENTION

The present invention relates to a method of manufacturing a thin film magnetic head and, more particularly, to a method of manufacturing a magnetoresistive head for high density recording and reading.

A magnetoresistive (MR) head or a giant magnetoresistive (GMR) head used as a read head of a high density magnetic recording head has been required to be adaptable to a track with a further reduced width for attaining high recording density.

Patent Document 1 (Japanese Patent Laid-open No. 6-267843) discloses a lift-off method using a two-layered resist. Specifically, this lift-off method involves forming a mask having an undercut in a two-layered film using a photoresist for the upper layer portion and polydimethyl glutar imide (PMGI) for the lower layer portion by the combination of irradiation of UV-rays and far UV-rays and twice development, and using a sputtering method as a method of forming the film. Patent Document 2 (Japanese Patent Laid-open No. 2002-64054) discloses a lift-off pattern prepared by using an organic film of a three-layered structure. Specifically, it discloses a method of disposing a resist having high resistance to dry etching for the uppermost layer as a resist pattern, forming an undercut in each of two-layered organic films as the underlayer thereof by a dry etching method using the lift-off pattern as a mask into a lift-off resist shape, and forming metal inter-connections by a lift-off method.

Patent Document 3 (Japanese Patent Laid-open No. 2003-131386) discloses a frame plating method of a thin film magnetic head using a resist pattern including a lower layer pattern, an intermediate layer pattern and an upper layer pattern.

BRIEF SUMMARY OF THE INVENTION

As a result of the study of the inventors, the following problems have been found. The technique described in Patent Document 1 involves a problem in that the width of the lift-off resist pattern is determined by the width of the resist pattern of an imaging layer. It is usually possible to form a track width of 300 nm minimum in a case of using an i-line stepper aligner, 200 nm minimum in a case of using a KrF excimer laser stepper aligner and about 100 nm minimum in a case of using a variable shaped electron beam device in view of the resolution thereof. However, a narrow track width exceeding the limit of the resolution cannot be formed by the techniques as they are.

In view of the above, for example, a method could be conceivable of forming a resist pattern and then etching the surface of the resist pattern by applying a step, for example, of a dry etching method thereby narrowing the width of the cross section of the resist pattern. Use of the method makes it possible to form a lift-off pattern less than the resolution and, accordingly, also to form a narrow track width exceeding the limit of the resolution. However, it has been found that since the lift-off pattern is in an overhung shape, when the pattern size is narrowed by etching the surface of the resist pattern by the dry etching method, the protruded portion of the overhung is etched simultaneously to result in a problem of rounding the top end of the overhung shape. That is, when the top end of the overhung is rounded, the distance from the lower portion of the PMGI layer as the lower layer to the overhung is made larger after dry etching compared with that before dry etching. Therefore, the following has been found. After a magnetic domain control film and an electrode film are stacked one on the other, the unnecessary portions of the magnetic domain control film and the electrode film are removed by lift-off. At this time, since the overhung portion is rounded, the magnetic domain control film and the electrode film formed by the sputtering method, etc. are connected between the surface of the lift-off resist and the etched portion of the GMR sensor. This causes a problem in that they cannot be lifted-off sufficiently in the lift-off step to leave fences in the portion.

It is therefore a feature of the present invention to provide a method of manufacturing a thin film magnetic head for attaining a giant magnetoresistive head, that is, a GMR head of a narrower track width than usual upon applying a method of preparing a magnetoresistive device, for example, a giant magnetoresistive head, that is, a GMR sensor using the resist pattern as a mask by a lift-off method. In particular, it is intended to provide a method of forming a thin film magnetic head capable of forming a GMR sensor with a track width narrower than the width of the imaging layer by narrowing the width of the imaging layer formed by an exposure apparatus in the dry etching step and by using a method of forming a lift-off pattern capable of forming the overhung portion sharply. Further, another feature of the invention is to provide a method of manufacturing a thin film magnetic head capable of forming the slant angle of the cross section at the end of the GMR sensor abruptly to 45° or more compared with a case of using a resist pattern only of two layers.

Further, according to the method of Patent Document 2, the resist pattern cannot be made finer than the resolution. In addition, the resist pattern for the second layer is narrower than the resist pattern for the uppermost layer. Therefore, this is applicable to a case of forming metal interconnections on a substrate such as a semiconductor substrate, dielectric substrate or pyroelectric substrate as shown in this known example. However, it is not suitable to a case of forming a narrow pattern as in the thin film magnetic head. Further, the resist layer at the uppermost layer has a property of high dry etching resistance. Therefore, the pattern width for the imaging layer cannot be narrowed further. For example, a fine pattern exceeding the limit of the resolution of the imaging layer cannot be formed.

The outline of typical inventions among those disclosed in the present application will be simply described as below. A typical invention has a feature, in manufacturing a magnetic head, of comprising a first step of forming a magnetoresistive film by way of a first insulation film on a shield layer, a second step of forming first, second and third resist films over the magnetoresistive film, a third step of patterning the first, second, and third resist films, a fourth step of etching the magnetoresistive film by using the patterned first, second and third resist films, a fifth step of forming a magnetic domain control film and an electrode film after the fourth step, a sixth step of removing the first, second and third resist films after the fifth step, and a step of depositing a second insulation film after the sixth step.

In this case, upon patterning of the first, second and third resist films, the third resist pattern as the uppermost layer is at first patterned, the first and second resist films as the lower layer are etched by using the same as a mask and then further etching the first resist film as the lowermost layer thereby decreasing the area of the first resist film to an area less than that of the second resist film.

According to the invention, a magnetic head of a narrow read track width using the lift-off method can be attained. The present invention provides an effect of providing a method of manufacturing a thin film magnetic head that can form a lift-off resist having a narrower width than that of the imaging layer formed, thereby enabling to form a GMR sensor with a track width narrower than that of the imaging layer. In particular, it is possible to attain a magnetic head with a read track width of 200 nm or less.

Further, the invention has an effect of providing a method of manufacturing a thin film magnetic head, which can make the end of the GMR sensor of the GMR head at an angle of as abrupt as 45° or more.

Further, the invention provides an effect of making the rear end, of the GMR sensor, in the direction of the depth thereof at an angle of as abrupt as 45° or more by applying the invention not only to the direction of the track width of a GMR sensor but also to the side of the stripe height.

Further, the invention has an effect of making the end, of the sensor film, in the direction of the track width or of the depth thereof at an angle of as abrupt as 45° or more also in the TMR head or CPPGMR head.

DETAILED DESCRIPTION OF THE INVENTION

Figure 11:
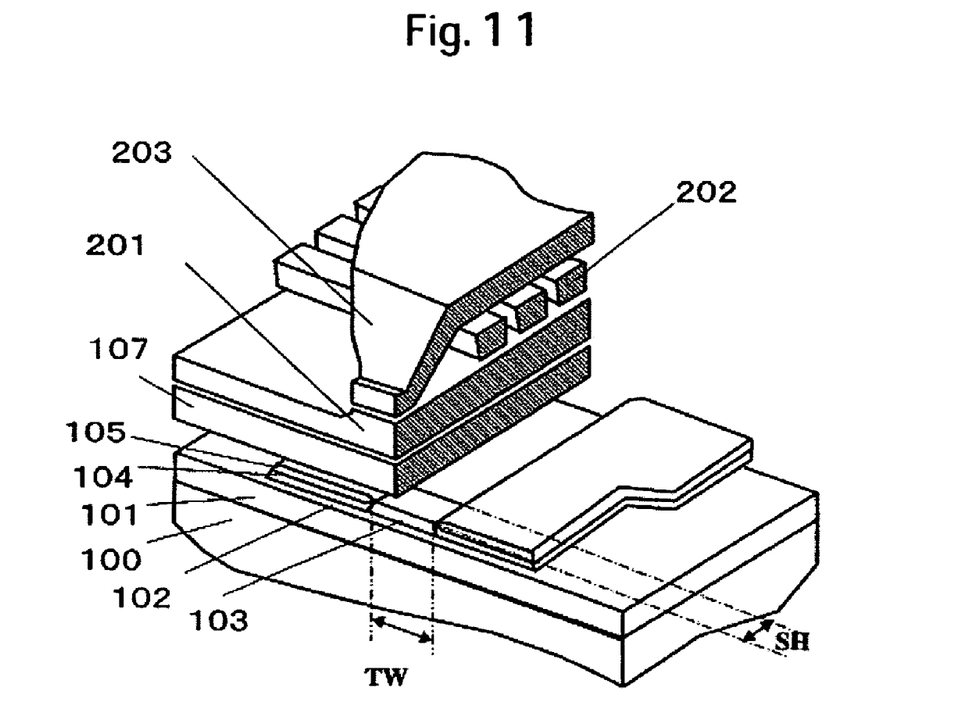
FIG. 11 is a perspective view for explaining a thin film magnetic head according to the invention.

FIG. 11 shows an example of a thin film magnetic head for use in a magnetic disk drive apparatus. A magnetic head comprises a write head and a read head in combination. A magnetoresistive head used as the read head comprises a magnetoresistive film 103, a lead electrode formed to supply a current to the magnetoresistive film and a magnetic domain control film. The magnetoresistive head generally uses a magnetoresistive film (MR film) or a giant magnetoresistive film (GMR film) as a film used for the sensor. In the magnetoresistive film of the read head, a magnetoresistive sensor film is formed with a width corresponding the track width (TW) on the side of the air bearing surface. A magnetic domain control film 104 for controlling the magnetization state of a sensor and an electrode film 105 for supplying a current to the sensor are configured to be stacked on both ends of the sensor as viewed from the air bearing surface. Further, the sensor film is formed to extend from the air bearing surface in the direction of the depth, and the size of the depth of the magnetoresistive film is referred to as a stripe height (SH) of the magnetoresistive sensor. The magnetoresistive sensor film is formed above a lower shield layer 101 on a substrate 100 by way of a lower insulation film 102. An upper insulation film is formed over the sensor on which an upper shield film 107 is formed, that is, the sensor is disposed between the lower and upper shields. The portions described above correspond to the read head portion. A write head portion is formed over the read head portion. The write head comprises a lower magnetic core 201, an upper magnetic core 203, and coils 202. While the upper shield 107 of the read head and the lower magnetic core 201 of the write head are separated from each other, they may be also merged in use.

EMBODIMENT 1

The present invention will be described by way of a first embodiment with reference to the drawings.

Figure 1:
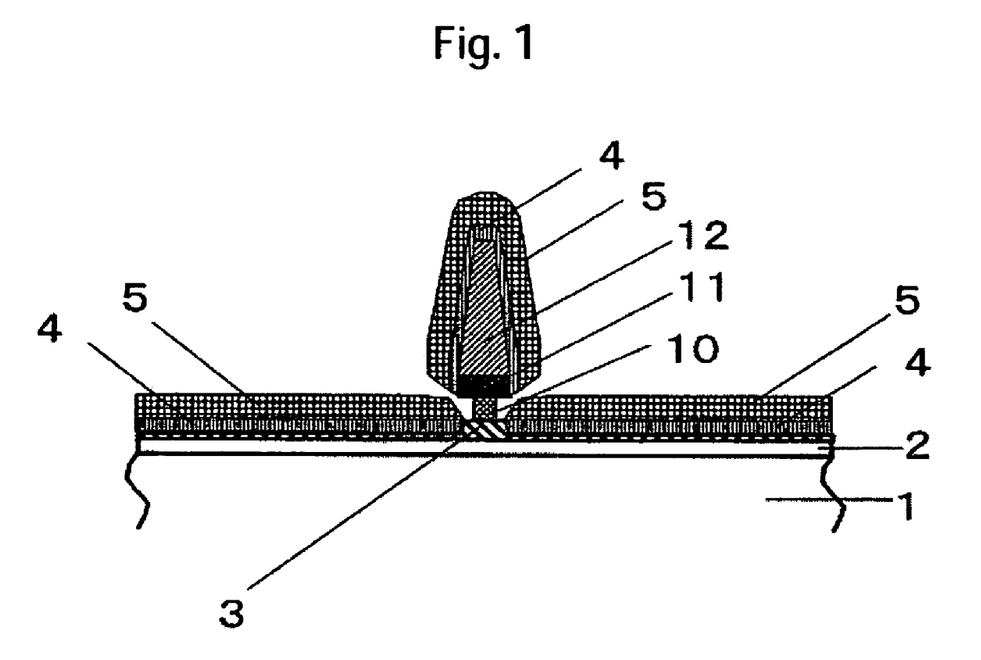
FIG. 1 is a cross sectional view for explaining a method of manufacturing a thin film magnetic head of Embodiment 1.

FIG. 1 is a cross-sectional view of a magnetic head before removal of resist layers by lift-off as viewed from an air bearing surface in manufacturing steps in which a GMR sensor film is formed as a magnetoresistive film 3 by ion milling and a magnetic domain control film 4 and an electrode film 5 are formed sputtering. Over a lower shield 1, a lower gap 2 is disposed, and an ion-milled GMR sensor 3 is formed thereon. The GMR sensor 3 has a constitution of stacking a seed layer, an anti-ferromagnetic layer, a pinned layer, a non-magnetic layer and a free layer. For example, the anti-ferromagnetic layer is formed of a PtMn film, the pinned layer is formed of two-layered CoFe films anti-ferromagnetically coupled by way of Ru, the non-magnetic layer is formed of a Cu film and the free layer is formed of a film containing NiFe and CoFe. In the three layered resist films, the resist film 12 as an uppermost layer is an imaging layer, the resist film 11 as an intermediate film is an organic film having an anti-reflection effect for light, and the resist 10 as a lowermost layer is a PMGI film. The resist film in contact with the GMR sensor has an area narrower than the area of the resist film 11 formed thereover as viewed in the direction of the film thickness. That is, also the width of the resist film 10 at the position of the air bearing surface is made less than the width of the resist film 11 as the upper layer as shown in the drawing. The read head portion of the magnetic head is completed by subsequent lift-off using a resist peeling solution while applying ultrasonic waves thereby removing three layered resist films and unnecessary magnetic domain control film and electrode film formed thereover and then forming an upper gap film and an upper shield film successively which are insulation films. Each of the steps is to be described specifically.

Figure 2:
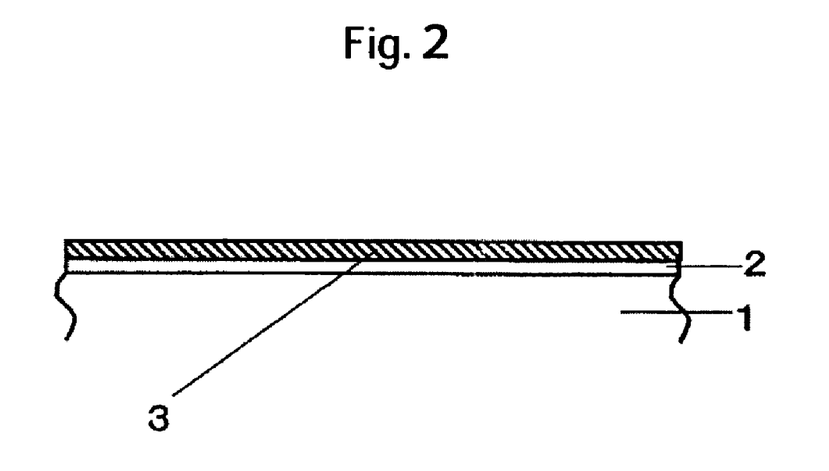
FIG. 2 is a cross sectional view for explaining the method of manufacturing a thin film magnetic head of Embodiment 1.

FIG. 2 is a cross-sectional view in a state of forming a lower shield film 1 over a substrate (not illustrated), a lower insulation film 2 thereover and then a GMR sensor film over the entire surface. The cross-sectional view shows a cross section at a portion corresponding to the air bearing surface when the GMR head is completed. Accordingly, while the GMR sensor film is formed over the entire upper surface of the lower shield and the lower insulation film in this cross-sectional portion, other portions than those described above may also be removed by etching before the step. That is, when the GMR stripe height is formed before this step, it gives no troubles in view of the invention.

Figure 3:
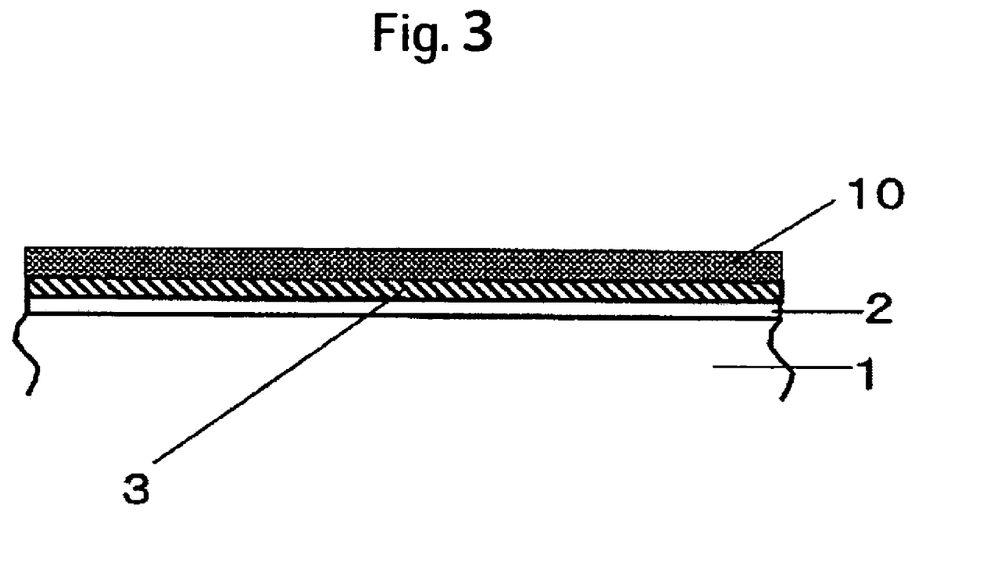
FIG. 3 is a cross sectional view for explaining the method of manufacturing a thin film magnetic head of Embodiment 1.

FIG. 3 shows a step of forming a PMGI film as a lowermost layer in the steps of forming a lift-off resist pattern of the invention. PMGI is an organic material referred to as a polymethyl glutar imide, which has photosensitivity to far ultraviolet light. Further, it has a property capable of being etched with an aqueous alkali solution such as a general developer solution for positive type photoresist.

Figure 4:
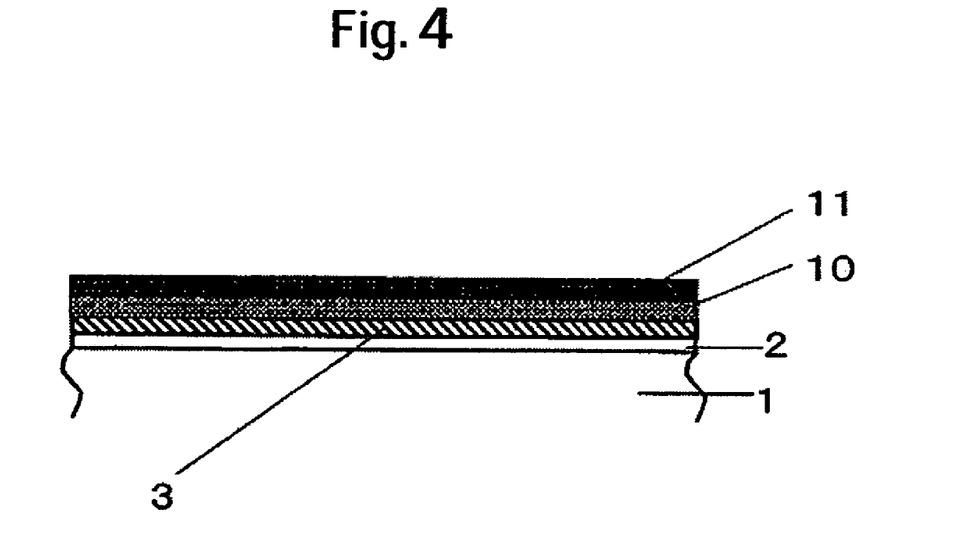
FIG. 4 is a cross sectional view for explaining the method of manufacturing a thin film magnetic head of Embodiment 1.

Successively, FIG. 4 shows a step of forming an organic film 11 having a feature of the invention on a PMGI film 10. Upon coating of the organic film, it is necessary that the film does not cause the so-called mixing in which organic films are mixed with each other with respect to the PMGI layer as the lower layer and that also mixing with the resist film formed thereon does not occur. In this case, it is confirmed that a BARC (Bottom Anti-Reflect Coating) material often used in a photoresist process, that is, an optical anti-reflection organic film is applicable for instance.

Figure 5:
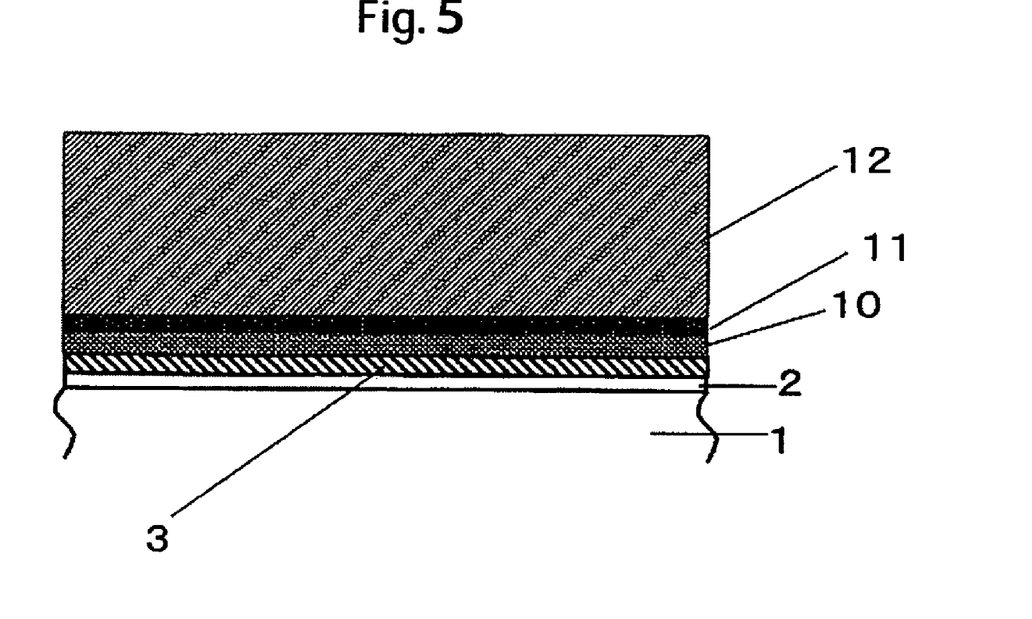
FIG. 5 is a cross sectional view for explaining the method of manufacturing a thin film magnetic head of Embodiment 1.

FIG. 5 shows a step of forming a resist film 12 as an imaging layer on the organic film 11. Any resist film can be used so long as it can be used as the imaging layer such as a photoresist film having photosensitivity or an electron beam resist film having sensitivity to an electron beam. Examples of the resist films include those having photosensitivity to g-line with a wavelength of 436 nm and i-line with a wavelength of 365 nm of mercury lamp light, a KrF excimer laser light with a wavelength of 248 nm and an ArF excimer laser light with a wavelength of 193 nm.

Figure 6:
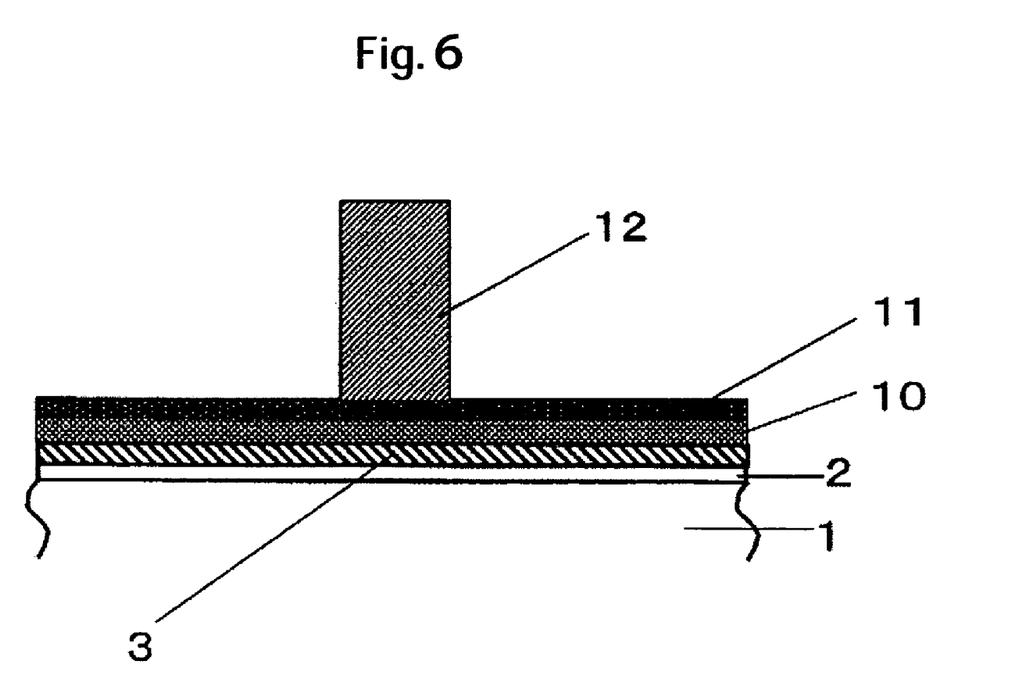
FIG. 6 is a cross sectional view for explaining the method of manufacturing a thin film magnetic head of Embodiment 1.

FIG. 6 shows a cross sectional shape at the time of forming a resist pattern after irradiating the electron beam resist film with an electron beam and then conducting development in a developer solution. The resist film 12 is formed on the organic film 11. In this case, it is necessary that the organic film 11 has a property not etched by the developer solution when the resist film 12 is patterned as described above. Due to the property, the resist pattern can be formed over the organic film. While the PMGI film 10 formed at the lowermost portion has a property to be etched with the developer solution, since the organic film 11 covers the surface of PMGI in this case, the PMGI film is not developed upon development of the resist film 12.

Figure 7:
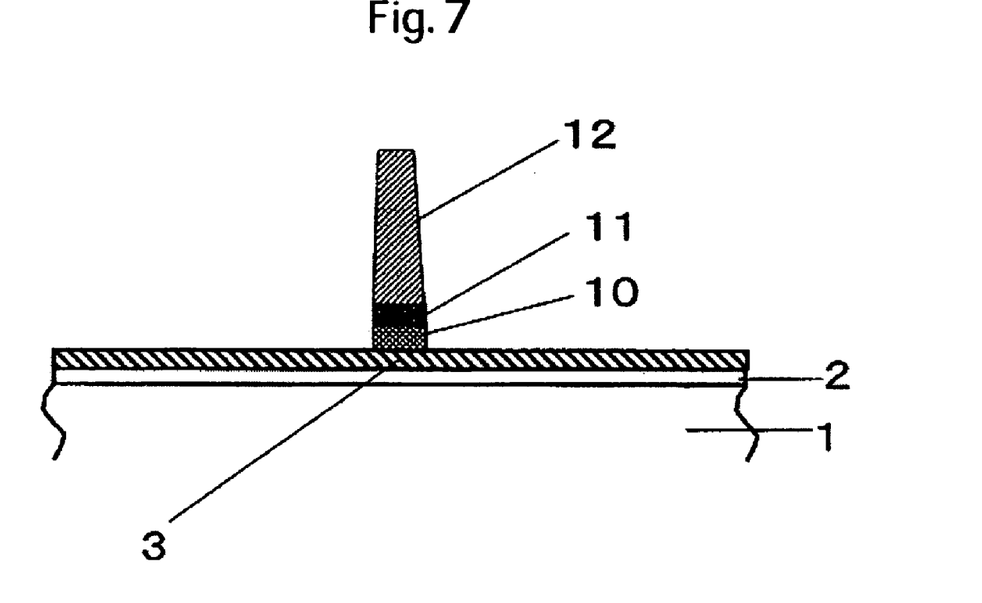
FIG. 7 is a cross sectional view for explaining the method of manufacturing a thin film magnetic head of Embodiment 1.

FIG. 7 shows a step of etching the organic film 11 of the lower layer using the resist pattern as a mask and then etching the PMGI film 10 using the organic film 11 as a mask. In this etching method, a step of etching by using a dry etching method such as an RIE (Reactive Ion Etching) method is shown. Examples of the dry etching method to be applied here include a dry etching method using an oxygen gas. In this case, not only the oxygen gas but also other gases, for example, an argon gas can be added. Alternatively, any other gases than the oxygen gas that can etch the organic film such as a carbon dioxide gas or nitrogen gas may also be used. Further, as the dry etching method, an etching method capable of anisotropic etching is preferred.

Since the imaging layer used as the mask material is also an organic film, the resist film of the imaging layer is etched not only in the direction of the film thickness but also in the direction of the width. Accordingly, since the etching is made in the width direction, the resist pattern as the imaging layer can be formed to a size smaller than the minimal pattern width for the limit of the resolution of the resist pattern. For example, by forming the imaging layer to 100 nm wide shown in FIG. 6 and then etching by 25 nm on each side in the direction of the width in the dry etching step in FIG. 7, a resist pattern of 50 nm wide can be formed finally. Another method of forming the imaging layer is, for example, using a KrF excimer laser light. In this method, when the width of the imaging layer is formed to 200 nm and then etched by 25 nm in the direction of the width on each side by the dry etching step in FIG. 7, a resist pattern of 150 nm width can be formed finally.

Figure 8:
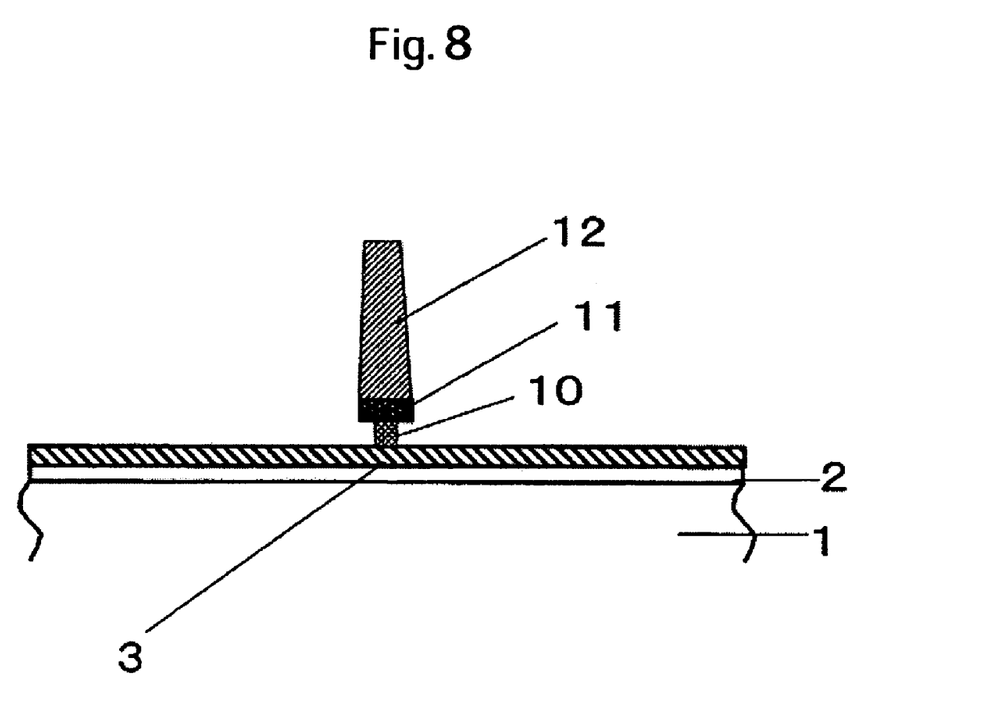
FIG. 8 is a cross sectional view for a explaining a method of manufacturing a thin film magnetic head of Embodiment 1.

FIG. 8 shows a step of forming, for the thus formed resist pattern, a lift-off resist pattern in an undercut shape by etching the PMGI layer as the lowermost layer by treatment with a developer solution for resist. A resist pattern with an undercut is essential for the lift-off step. The PMGI layer can be etched with an alkaline developer solution that develops the resist pattern of the imaging layer. Then, the continuous three-layered pattern formed in FIG. 7 is treated with the developer solution to etch the PMGI layer from the end of the pattern, thereby forming the undercut. During the treatment with the developer solution, the resist pattern of the imaging layer is scarcely etched. Further, the organic film 11 formed between the resist layer 5 and the PMGI layer 3 has a property not etched with the developer solution that forms the pattern of the imaging layer. Accordingly, only the PMGI layer can be etched to form a lift-off resist pattern of the undercut shape. With the undercut, the area of the PMGI film on the surface vertical to the air bearing surface is made less than the area of the organic film 11 on the surface vertical to the air bearing surface. That is, not only the lateral direction of the air bearing surface but also the width in the direction of the height for the device is also undercut to facilitate lift-off.

For example, in a case of forming the undercut to a pattern of about 50 nm wide, it is necessary to form an undercut of about 15 nm. An aqueous 2.38% solution of TMAH (tetramethyl ammonium hydrooxide) is used usually as the developer solution. It has been found that when the developer solution is continuously used as it is, the etching speed of the PMGI layer is excessively fast in order to control the amount of undercut to about 15 nm. In order to solve this problem, it has been found that the developer solution for under-cutting the PMGI layer is preferably applied with changing concentration lower compared with that used for the development of the imaging layer. For example, it has been found that an aqueous 1% solution of TMAH is used appropriately. However, a developer solution at a further lower concentration can also be applied.

Then, the GMR sensor film is etched and a magnetic domain control film and an electrode film are formed by using the lift-off resist pattern.

Figure 9:
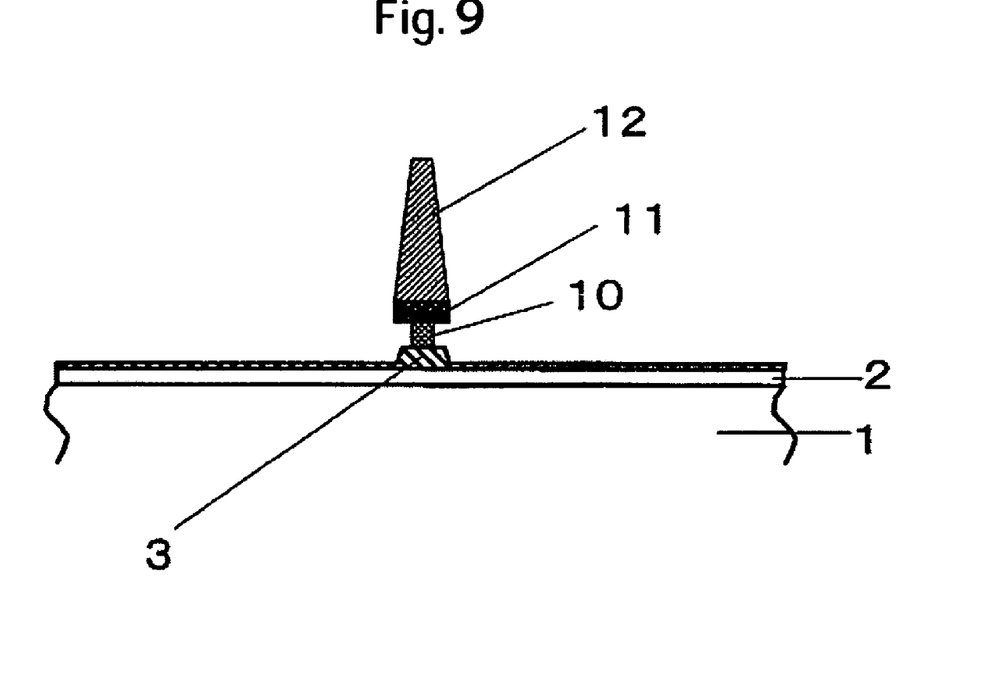
FIG. 9 is a cross sectional view for explaining the method of manufacturing a thin film magnetic head of Embodiment 1.

FIG. 9 shows a shape formed by etching the GMR film using the resist pattern as a mask. In the figure, the GMR film is shown as a shape formed by etching the film to an intermediate thickness and completing the etching while leaving a portion of the film constituting the GMR film over the lower gap film. However, the GMR film may be entirely etched.

Then, the magnetic domain control film 4 and the electrode film 5 are formed continuously, for example, by a deposition method using sputtering or ion beams. FIG. 1 shows the cross section in this step. Then, the magnetic domain control film 4 and the electrode film 5 are formed in a stacked manner at the etched portion of the GMR film 3, and likewise they are formed in a stacked manner also above the lift-off resist pattern. Since the undercut portion is formed for the PMGI layer as the lowermost layer of the lift-off resist, this can provide a structure in which the stacked films of magnetic domain control film and the electrode film are separated from each other at the portion.

Figure 10:
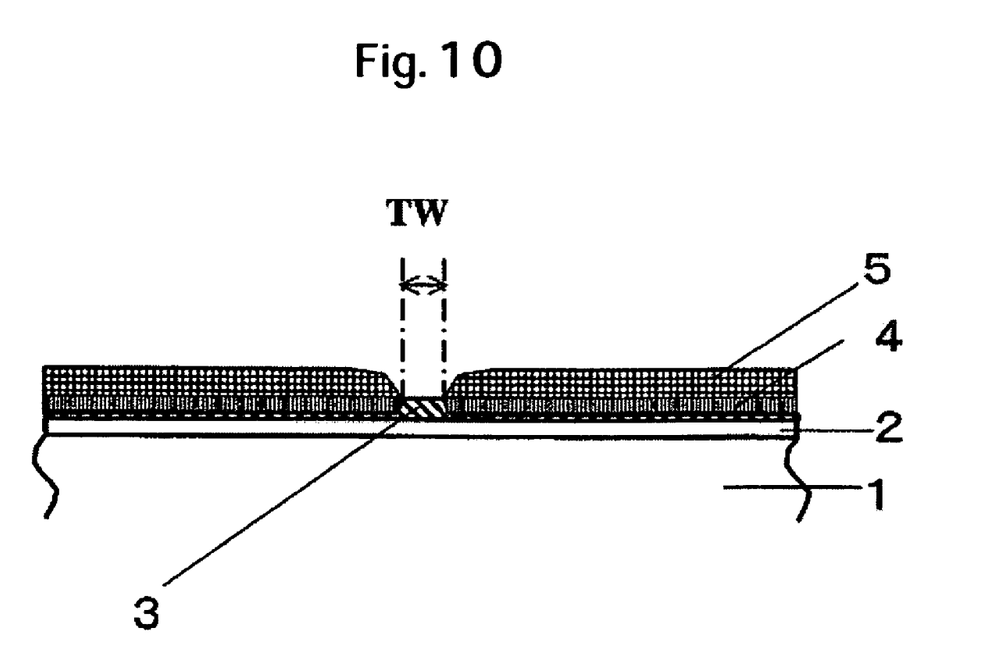
FIG. 10 is a cross sectional view for explaining the method of manufacturing a thin film magnetic head of Embodiment 1.

Then, by using the thus formed pattern, the unnecessary portion of the magnetic domain control 4 and the electrode film 5 formed above the lift-off resist pattern are removed simultaneously with the removal of the lift-off resist pattern. By lifting-off the unnecessary portion, a track portion of the GMR sensor with a narrow track width (TW) can be formed as shown in FIG. 10.

In a case of using the existent two-layered lift-off resist pattern, the re-deposition layer intrudes into and deposits at the undercut portion upon ion milling or a portion of the deposition film formed subsequently intrudes into the inside of the undercut portion. Therefore, a fence-like film remains in the unnecessary portion. However, the width of the undercut or the amount of the undercut can be controlled precisely according to the invention. This is particularly effective for the read track width of 200 nm or less and a magnetic head with a read track width smaller than the resolution of the imaging layer can be attained. Further, rounding at the lower end of the imaging resist pattern can be suppressed, that is, excess etching of the GMR sensor film due to the rounding can be prevented. The shape at the end of the GMR sensor film can, therefore, be formed abruptly at an angle of 45° or more in the invention. As described above, when the invention is applied to the direction of the track width of the GMR sensor, it is possible to provide a method of manufacturing a thin film magnetic head having a narrow track and making the end of the GMR sensor at an angle of as abrupt as 45° or more. Further, the narrow track can be formed to have a size exceeding the limit of the resolution of the imaging layer.

EMBODIMENT 2

The present invention will be described with reference to another embodiment. The GM sensor is formed by using a lift-off resist also with respect to the end in the direction of the depth, that is, in the direction of the stripe height. By applying the invention, it is possible to form a GMR sensor with an abrupt end. The etching process for the resist is conducted not only in the lateral direction at the air bearing surface but also in the direction of the height of the element or device. Therefore, this process can be attained at the same time with the process of Embodiment 1.

Figure 12:
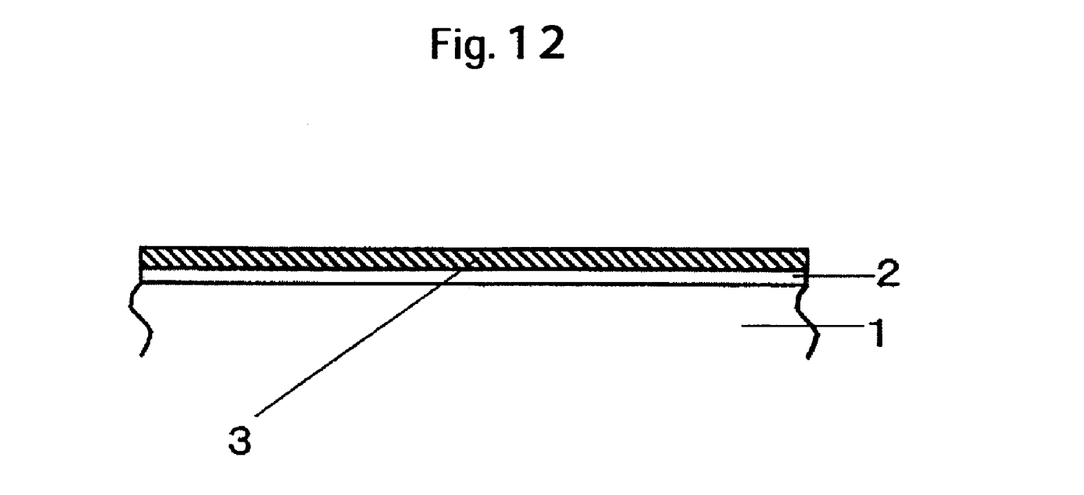
FIG. 12 is a cross sectional view for explaining a method of manufacturing a thin film magnetic head of Embodiment 2.
Figure 13:
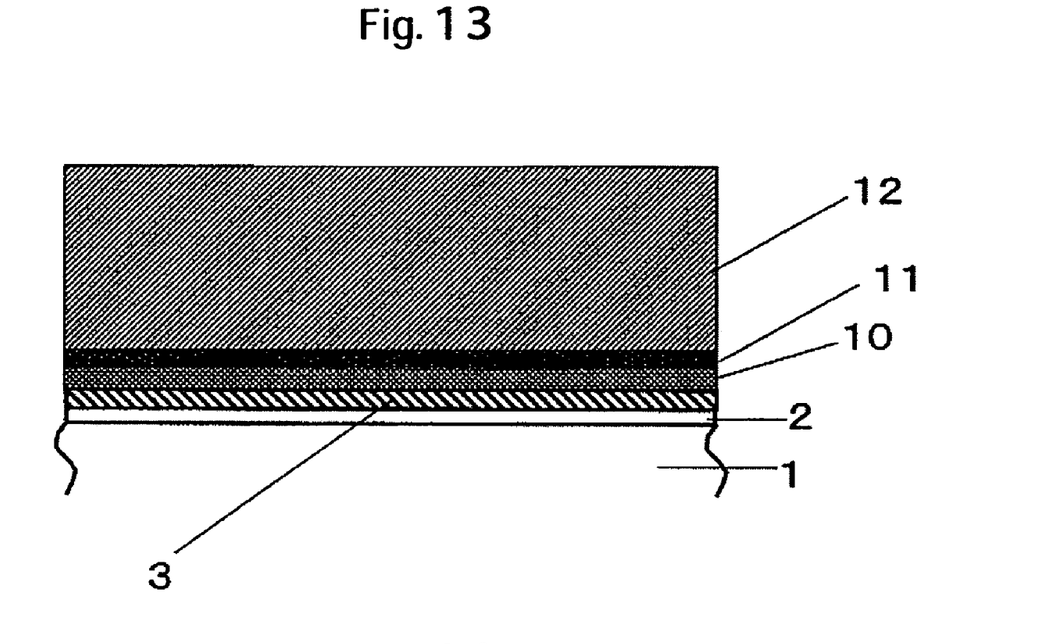
FIG. 13 is a cross sectional view for explaining the method of manufacturing a thin film magnetic head of Embodiment 2.
Figure 14:
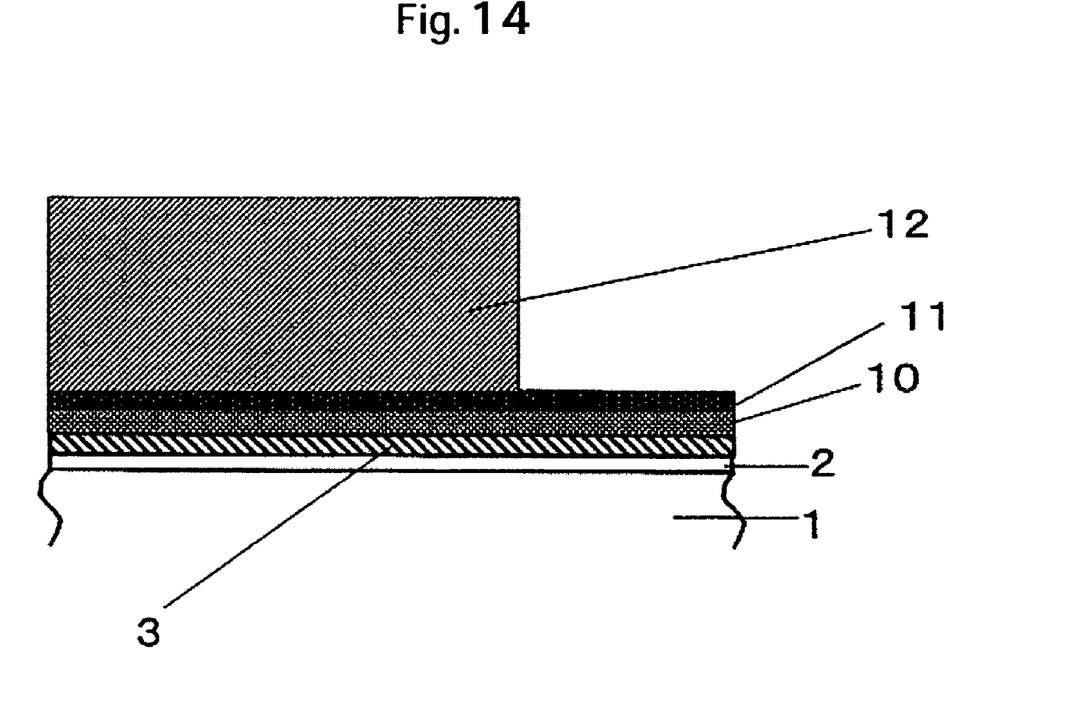
FIG. 14 is a cross sectional view for explaining the method of manufacturing a thin film magnetic head of Embodiment 2.
Figure 15:
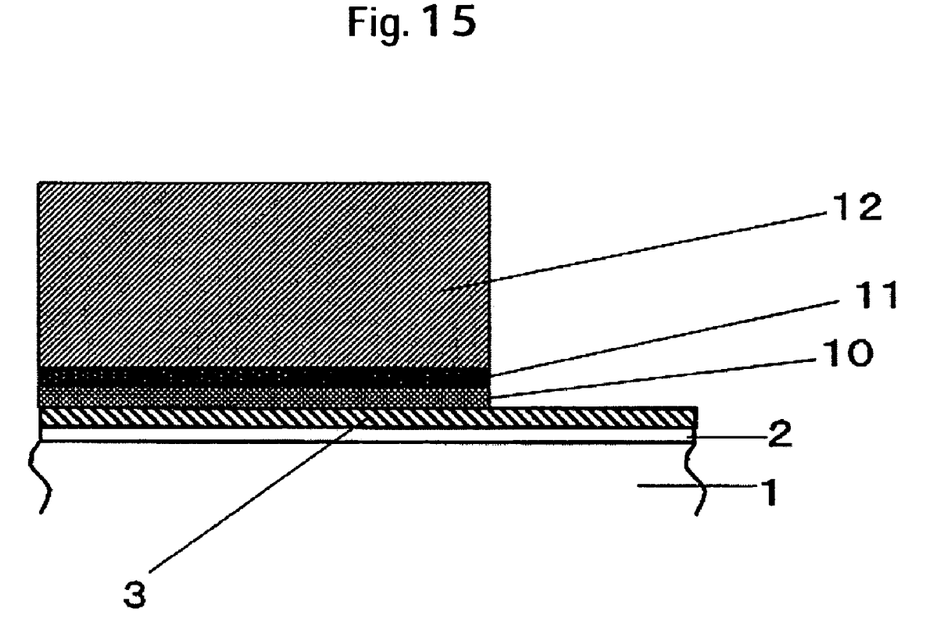
FIG. 15 is a cross sectional view for explaining the method of manufacturing a thin film magnetic head of Embodiment 2.
Figure 16:
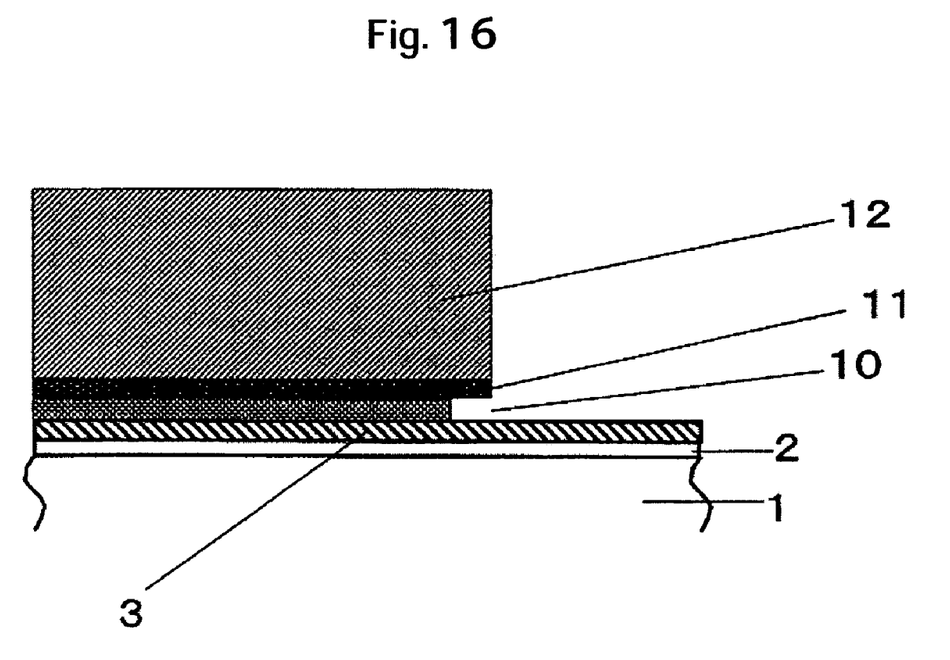
FIG. 16 is a cross sectional view for explaining the method of manufacturing a thin film magnetic head of Embodiment 2.
Figure 17:
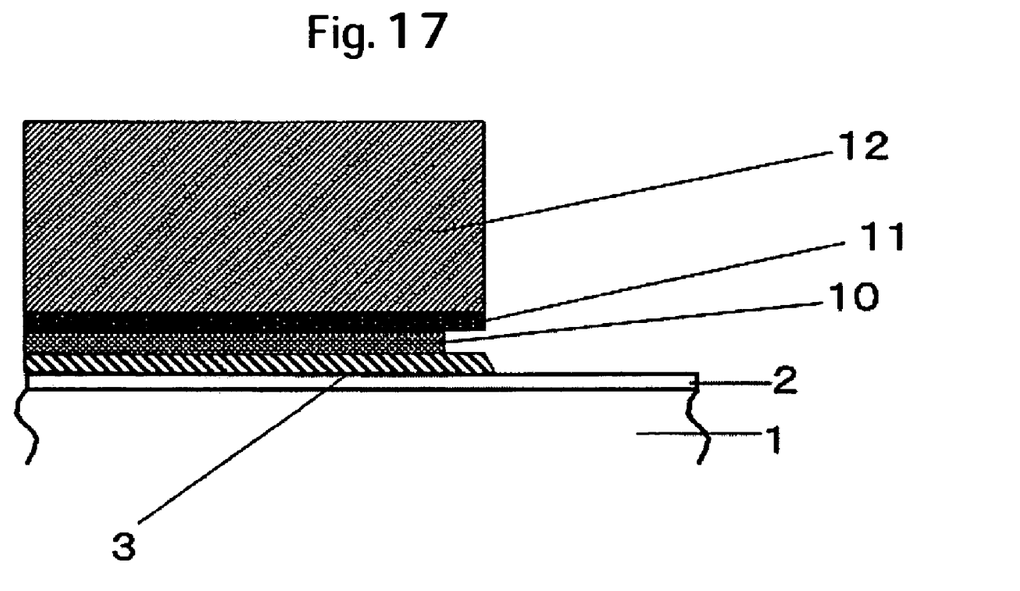
FIG. 17 is a cross sectional view for explaining the method of manufacturing a thin film magnetic head of Embodiment 2.
Figure 18:
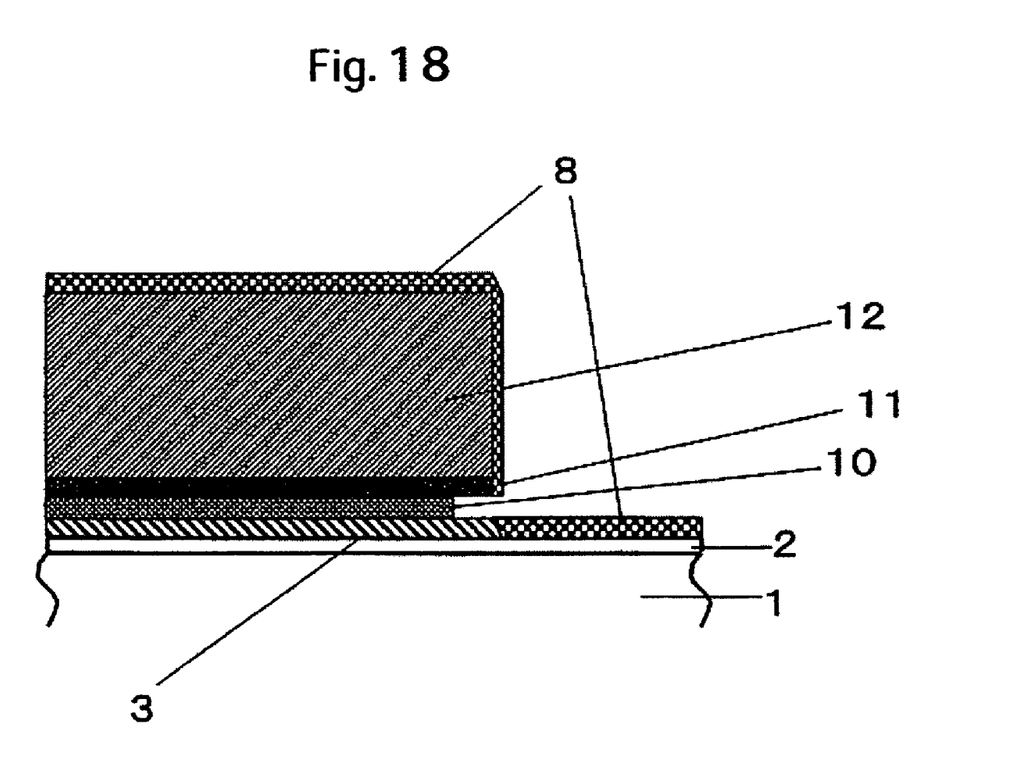
FIG. 18 is a cross sectional view for explaining the method of manufacturing a thin film magnetic head of Embodiment 2.
Figure 19:
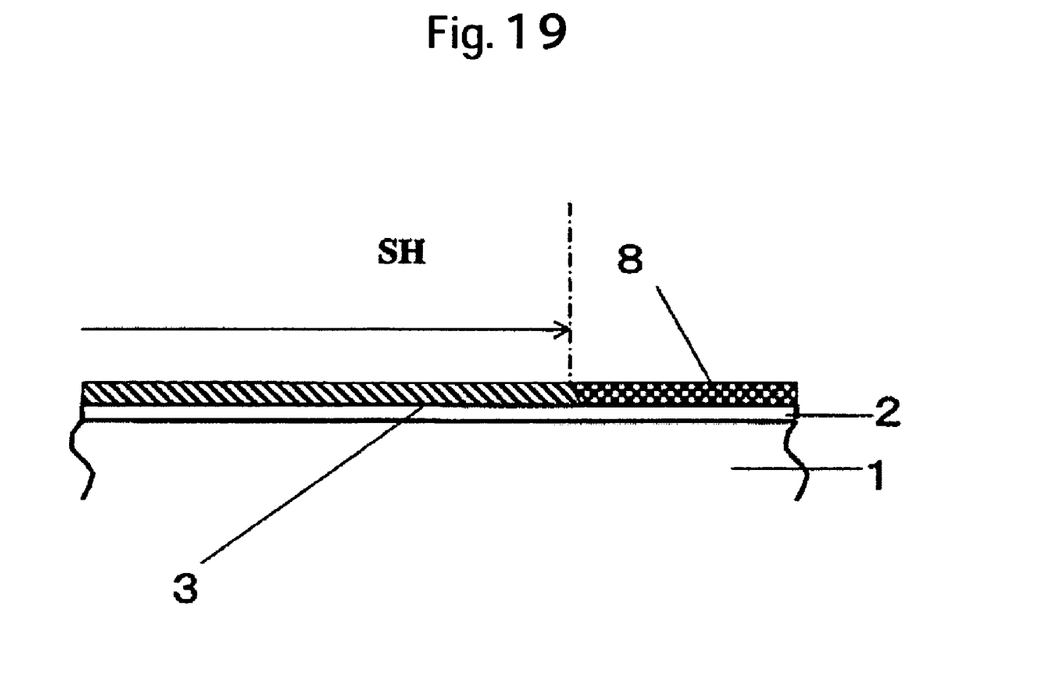
FIG. 19 is a cross sectional view for a thin film magnetic head of Embodiment 2.

A description will be made with reference to the drawings. FIG. 12 shows a cross-sectional view of a GMR film formed over the substrate. Three-layered resist films comprising a PMGI layer 10, an organic film layer 11 and an imaging layer 12 are formed over the GMR film 3 as shown in FIG. 13. Then, as shown in FIG. 14, a pattern corresponding to the stripe height is formed on the imaging layer 12 at the uppermost layer by exposure and development. Since the stripe pattern generally uses a width of about 1 to 5 µm, only the position of the stripe height of zero is shown in the figure. Successively, as shown in FIG. 15, using the imaging layer 12 as a mask, the underlying organic film layer 11 and the PMGI layer 10 are etched by using a dry etching method. The lift-off pattern requires an overhang cross-sectional shape. Then, as shown in FIG. 16, an overhang lift-off resist pattern is prepared by coating a diluted developer solution, for example, a solution such as an aqueous 1% TMAH solution on a substrate and etching the end of the PMGI layer 10. Preferably, a diluted developer solution should have a concentration of TMAH within a range of as low as about 0.2 to 1.5%. By using the lift-off pattern as a mask, the GMR sensor 3 is etched by an ion milling method as shown in FIG. 17. In a case of the stripe height direction, the etched end is sometime protected with an insulation film. That is, an insulation film 8 is formed over the entire surface, for example, by a sputtering method or a vacuum vapor deposition method such as a positioning method by ion beams. FIG. 18 is a cross-sectional view in this case. Then, the unnecessary portion of the insulation film is peeled by lift-off simultaneously with the peeling of the lift-off resist pattern. Thus, a pattern in the direction of the stripe height (SH) of the GMR sensor can be formed as shown in FIG. 19.

Since the overhang portion of the lift-off resist is formed sharply at the end of the stripe height, and ion beam etching is applied using the portion as a mask, this embodiment can provide an effect of forming the end at an angle, in cross section, of as abrupt as 45° or more.

EMBODIMENT 3

Still another embodiment of the invention will be described.

Figure 20:
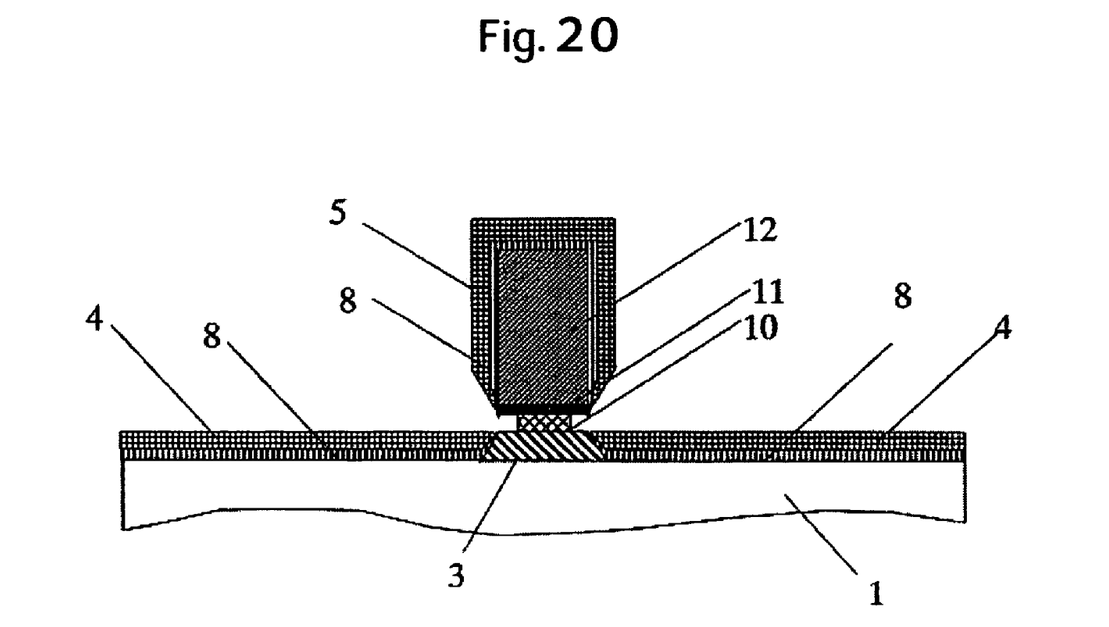
FIG. 20 is a cross sectional view for explaining a method of manufacturing a thin film magnetic head of Embodiment 3.

FIG. 20 shows an example of a read head, in cross section as viewed from the direction of the track width, having a structure in which current is supplied in the direction of the thickness of the magnetoresistive film typically represented by a TMR or CPPGMR sensor. A description is made of the entire constitution of supplying a current between the lower shield and the upper shield. A TMR film or CPPGMR film 3 as a magnetoresistive film is formed over a lower shield 1, then a lift-off resist pattern of a three-layered structure (10, 11, 12) of the invention is formed, and then an unnecessary portion of the TMR film or CPPGMR film 3 is removed by etching. An insulation film 8 and a magnetic domain control film 5, shown in cross section, are formed. The lift-off resist pattern of the three-layered structure comprising the PMGI film 10, the organic film 11 having the optical anti-reflection effect, and the resist film 12 of the imaging layer are formed in the same method as that of Embodiment 1. That is, after deposition of the magnetoresistive film 3 over the lower shield film 1, the first resist film 10, the second resist film 11 and the third resist film 12 are stacked successively. At the time of patterning the first, second and third resist films, the third resist film 12 as the uppermost layer is at first patterned, then the first and second resist films 10 and 11 as the lower layers are etched by a dry etching method using the patterned third resist film. Then the first resist film 10 at the lowermost layer is further etched by a developer solution to decrease the area of the first resist film to an area less than that of the second resist film. In this case, by lowering the concentration of the developer solution to a level less than that of the developer solution for developing the imaging layer, the etching rate is lowered. After patterning of the three-layered resist films, the magnetoresistive film is etched by an ion milling method by using the same as a mask thereby forming the lateral surfaces thereof into a taper in cross section.

The TMR film comprises a seed layer, an anti-ferromagnetic layer, a pinned layer, a barrier layer comprising an insulation film, and a free layer. The anti-ferromagnetic layer, the pinned layer, the free layer can use the respective layers cited in Embodiment 1. The CPPGMR film has the same constitution as that for the CIPGMR sensor of Embodiment 1. That is, the constitution is made such that the seed layer, the anti-ferromagnetic layer, the pinned layer, the non-magnetic layer and the free layer are stacked.

Figure 21:
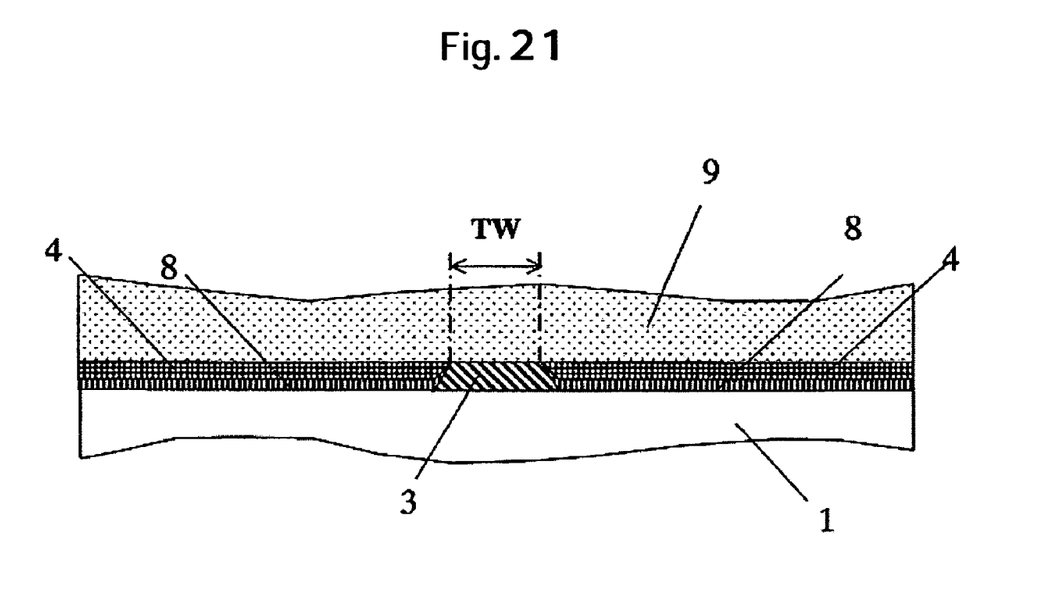
FIG. 21 is a cross sectional view for a explaining a method of manufacturing a thin film magnetic head of Embodiment 3.

Then, as shown in FIG. 21, after removal of the unnecessary portion of the insulation film 8 and the magnetic domain control film 5 by lift-off, an upper shield film 9 also serving as an electrode is formed over the TMR film or CPPGMR film 3 thereby forming the film of the TMR film or CPPGMR film 3 put between the lower shield and the upper shield. Thus, a read head can be formed. The upper and lower shields are formed of a magnetic material such as permalloy. While this embodiment has a constitution in which the shield and the electrode are merged but, instead, it may be of a constitution in which a lower electrode is disposed between the lower shield 1 and the magnetoresistive film 3 and an upper electrode is formed between the upper shield 9 and the magnetoresistive film 3. Further, a conductive non-magnetic film may also be formed between the shield and the magnetoresistive film.

While a descriptions have been made with reference to the cross sectional view in the direction of the track width (TW) of the read head, it will be apparent that the same manufacturing method is also applicable in terms of the direction of the stripe height (SH), which is the direction of the height of the magnetoresistive device.

While the invention can of course be applicable to the manufacture of a thin film magnetic head for use in a hard disk apparatus, this is applicable generally to manufacturing methods of preparing fine patterns by the combination with the lift-off method. Further, it can also be applied to the manufacturing method not only for the magnetoresistive head and the giant magnetic head of the thin film magnetic head but also for the magnetoresistive head of a type in which a current is supplied in the direction of the film thickness, for example, a TMR head or CPPGMR head. Further, this is also a manufacturing method capable of forming a fine pattern exceeding the limit of the resolution power of an exposing facility that forms the imaging layer.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of manufacturing a magnetic head, comprising:
    forming a magnetoresistive film by way of a first insulation film over a shield film;
    forming first, second and third resist films over the magnetoresistive film, the first resist film disposed between the magnetoresistive film and the second resist film, the second resist film disposed between the first and third resist films, and the third resist film disposed on the second resist film,
    patterning the first, second and third resist films by,
        patterning the third resist film by development in a liquid developer solution,
        etching the second and first resist films with a dry etching chemistry using the patterned third resist film as a mask, wherein the third resist film is also etched, such that a width of the third resist film is the same as a width of the second resist film at an interface of the third and second resist films, and the width of the third resist film is narrower than the width of the second resist film in a thickness direction away from the interface, and
        further etching the first resist film with a wet etching chemistry that does not etch the second resist film, such that a corner of a lower end of the second resist film does not become rounded, wherein a thickness of the third resist film is thicker than a thickness of the second resist film;
    etching the magnetoresistive film by using the patterned first, second and third resist films;
    forming a magnetic domain control film and an electrode film after etching the magnetoresistive film;
    removing the first, second and third resist films after forming the magnetic domain control film and the electrode film; and
    depositing a second insulation film after removing the first, second and third resist films.

2. A method of manufacturing a magnetic head according to claim 1, wherein:
    in further etching the first resist film, the first resist film is etched such that an area thereof is narrower than an area of the second resist film.

3. A method of manufacturing a magnetic head according to claim 1, wherein:
    the first resist film is a PMGI film; and
    a material not mixing the first resist film and the third resist film is used for the second resist film.

4. A method of manufacturing a magnetic head according to claim 1, wherein:
    the first resist film is a PMGI film; and
    the second resist film is an organic film.

5. A method of manufacturing a magnetic head according to claim 1, wherein:
    the second resist film is an organic film having a light anti-reflection effect.

6. A method of manufacturing a magnetic head according to claim 1, wherein:
    a resist developer solution of an aqueous alkaline solution is used in further etching the first resist film.

7. A method of manufacturing a magnetic head according to claim 1, wherein:
    an ion milling method is used in etching the magnetoresistive film;
    a lift-off method is used for removing the first, second and third resist films; and
    a dry etching method is used in patterning the third resist film.

8. A method of manufacturing a magnetic head according to claim 1, wherein:
    the developer solution used for further etching the first resist film has a concentration lower than the concentration of the developer solution used for developing the third resist film in patterning the third resist film.

9. A method of manufacturing a magnetic head according to claim 8, wherein:
    the developer solution is an aqueous solution of tetramethyl ammonium hydroxide.

10. A method of manufacturing a magnetic head according to claim 1, wherein:
    a width of a read track of the magnetic head is less than 200 nm.

11. A method of manufacturing a magnetic head according to claim 1, wherein:

an electron beam writing resist or a resist having more sensitivity to g-line, i-line, KrF excimer laser light with a wavelength of 248 nm, or ArF excimer laser light with a wavelength of 193 nm is used as the third resist film.

12. A method of manufacturing a magnetic head comprising:

forming a magnetoresistive film over a lower shield film;

forming first, second and third resist films over the magnetoresistive film, the first resist film is disposed between the magnetoresistive film and the second resist film, the second resist film disposed between the first film and the third resist film, and the third resist film disposed on the second resist film;

patterning the first, second and third resist films by,
patterning the third resist film by development in a liquid developer solution,
etching the second and first resist films with a dry etching chemistry using the patterned third resist film as a mask, wherein the third resist film is also etched, such that a width of the third resist film is the same as a width of the second resist film at an interface of the third and second resist films, and the width of the third resist film is narrower than the width of the second resist film in a thickness direction away from the interface, and
further etching the first resist film with a wet etching chemistry that does not etch the second resist film, such that a corner of a lower end of the second resist film does not become rounded, wherein a thickness of the third resist film is thicker than a thickness of the second resist film;

etching the magnetoresistive film by using the patterned first, second and third resist films;

forming an insulation film and a magnetic domain control film after etching the magnetoresistive film;

removing the first, second and third resist films by a lift-off method after forming the insulation film and the magnetic domain control film; and forming an upper shield film after removing the first, second and third resist films.

13. A method of manufacturing a magnetic head according to claim 12, wherein:

in further etching the first resist film, the first resist film is etched such that an area thereof is narrower than an area of the second resist film.

14. A method of manufacturing a magnetic head according to claim 13, wherein:

the first resist film is a PMGI film;

an organic film not mixing the first and third resist films is used for the second resist film; and a resist developer solution of an aqueous alkaline solution is used in further etching the first resist film.

15. A method of manufacturing a magnetic head according to claim 14, wherein:

the magnetoresistive film is a GMR film or a TMR film.

16. A method of manufacturing a magnetic head according to claim 14, wherein:

the developer solution used for further etching the first resist film is at a concentration lower than the concentration of the developer solution used for developing the third resist film in patterning the third resist film.

* * * * *

UNITED STATES PATENT AND TRADEMARK OFFICE
CERTIFICATE OF CORRECTION

PATENT NO.        : 7,605,006 B2                                           Page 1 of 1
APPLICATION NO. : 11/331426
DATED             : October 20, 2009
INVENTOR(S)      : Morijiri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Fifth Day of October, 2010

David J. Kappos
*Director of the United States Patent and Trademark Office*